United States Patent [19]

Favre et al.

[11] Patent Number: 4,846,052
[45] Date of Patent: Jul. 11, 1989

[54] DEVICE FOR THE EXTRACTION OF CARTRIDGES

[75] Inventors: Eric Favre, Saint-Barthelemy; Petr Masek, Yverdon, both of Switzerland

[73] Assignee: Nestec S.A., Vevey, Switzerland

[21] Appl. No.: 32,043

[22] Filed: Mar. 27, 1987

[30] Foreign Application Priority Data

Apr. 24, 1986 [CH] Switzerland .................. 1668/86

[51] Int. Cl.⁴ .......................................... A47J 31/24
[52] U.S. Cl. .................................. 99/295; 99/302 R
[58] Field of Search ............ 99/295, 279, 300, 302 R, 99/307, 306; 100/122, 123, 125; 426/433; 53/371, 373

[56] References Cited

U.S. PATENT DOCUMENTS

| | | | |
|---|---|---|---|
| 2,589,783 | 3/1952 | Crossley | 99/295 |
| 3,295,998 | 1/1967 | Goros | 99/295 X |
| 3,384,004 | 5/1968 | Perlman | 99/289 |
| 3,470,812 | 10/1969 | Levinson | 99/295 |
| 3,812,273 | 5/1974 | Schmidt | 99/295 X |
| 3,975,996 | 8/1976 | Vitous | 99/295 |
| 4,136,202 | 1/1979 | Favre | 426/77 |
| 4,389,925 | 6/1983 | Piana | 99/289 R |
| 4,667,587 | 5/1987 | Wunder | 99/295 |

FOREIGN PATENT DOCUMENTS 605293  9/1978  Switzerland .

Primary Examiner—Harvey C. Hornsby
Assistant Examiner—Scott J. Haugland
Attorney, Agent, or Firm—Vogt & O'Donnell

[57] ABSTRACT

A device for extracting material contained in cartridges has a housing body having a hollow interior, defined by the inside of the housing body which extends to and terminates at an open bottom, in a form which substantially conforms to the form of a cartridge to be extracted for accepting a cartridge for extraction. An upper portion of the housing includes an injection element having a point which protrudes into the hollow interior for opening and penetrating a cartridge for extraction of the material in the cartridge. The outside of the housing body has an upper protruding part and a lower protruding stop beneath and displaced from the upper protruding part. A movable ring circumscribes the housing and the stop and has a lug protruding towards the outside of the housing body which is capable of communicating with the stop, the lug being positioned on the ring such that when the lug and stop are in communication, the ring protrudes below the bottom of the housing. A spring is confined between the lug and upper protruding part and the ring and the housing body for urging the lug into communication with the stop. A cartridge holder has an edge for holding a rim of a cartridge and cooperates with the movable ring for holding the rim of the cartridge during extraction and for releasing the cartridge after extraction.

7 Claims, 2 Drawing Sheets

DEVICE FOR THE EXTRACTION OF CARTRIDGES

BACKGROUND OF THE INVENTION

This invention relates to a device for the extraction of cartridges intended for the preparation of a beverage in a cartridge holder for coffee machines, this device being designed to be fitted onto the water outlet of the machine.

To make good espresso coffee from the cartridges according to CH-PS 605 293, certain requirements have to be satisfied during the extraction of the cartridges. The requirements are in particular that the ground and roasted coffee contained in the cartridge has to be uniformly wetted. The cartridge then has to open and the extraction phase has to be as short and as effective as possible.

SUMMARY OF THE INVENTION

The extraction device according to the present invention enables all the above-mentioned requirements and others explained in more detail hereinafter to be satisfied. The invention relates to an extraction device comprising a hollow cylindrical body of which the inner form conforms closely to the outer form of the cartridge to be extracted, said body comprising an injection element at its upper part along the axis of said cylinder and, on its outer part, a spring which holds a ring for the release of the cartridge at the end of extraction.

The injection element is designed directly to pierce the cartridge when it is introduced into the coffee machine, the water pump then delivering the quantity of water required for wetting to the injection element through the water heater.

The number of holes provided in the injection element is preferably between one and six, more especially two holes diametrically opposite one another. The axis of these holes forms an angle of from 70° to 80° with the axis of the cylinder. This arrangement is useful for allowing effective diffusion of the water throughout the mass of coffee in the cartridge so as to obtain complete extraction and to avoid the formation of channels in the ground coffee. To open the cartridge, the injection element has to have a point, the angle of the point preferably being between 20° and 40° in order not to damage the upper dome of the cartridge.

The holes of the injection element are well-defined in size. This is because they have to be sufficiently wide to allow uniform arrival of the water under a pressure of as high as 15 bars, but not too large so as to avoid any risk of back-flow of the grounds at the end of extraction. The holes are from 0.2 to 1 mm and preferably 0.6 or 0.8 mm in diameter. On the outside of the cylindrical body of the extraction device, there is a helical spring and the release ring of the cartridge is preferably made of a plastic material accepted in the food sector.

The extraction device according to the invention additionally comprises a cartridge holder having a cylindrical inner form with an annular edge co-operating with the lower part of the cylindrical body. To ensure that, while the coffee is being made, the froth does not collapse and the jet remains vertical, the cartridge holder is provided with a system for cutting off the jet and with an inlet opening for air.

The invention is described in more detail in the following with reference to the accompanying drawings, wherein:

DESCRIPTION OF PREFERRED EMBODIMENTS

Figure 1:
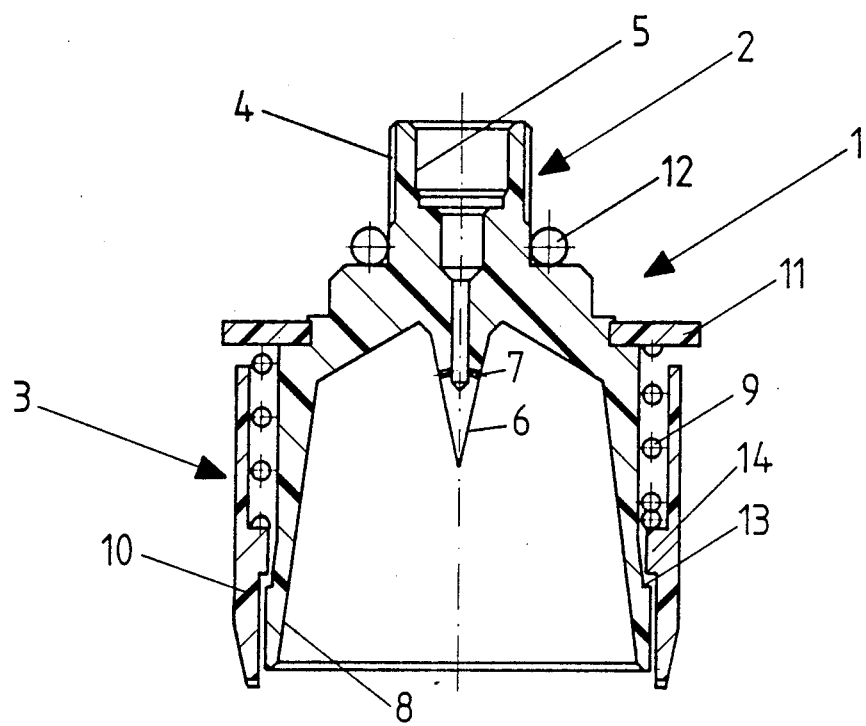
FIG. 1 is an axial section through the extraction device according to the invention.

The extraction device (1) comprises an upper part (2) with a screwthread (4) and a seal (12) for screwing onto the water outlet of a coffee machine and a hollow cylindrical body (3). The water passes through the bore (5) into the injection element (6) comprising two holes (7). The housing body (3) has an inner form (8) defining a hollow interior extending to and terminating at an open bottom of the housing body and, on its outer part, comprises a helical spring (9) holding a ring (10) to release the cartridge ridges at the end of extraction. The ring (10) which circumscribes the housing body and the stop is limited in its movement on the one hand by the annular part (11) protruding from the upper portion of the housing body on the outside of the housing body (spring (9) compressed) and on the other hand by the stop protruding from a lower portion of the housing on the outside of the housing body beneath and displaced from the protruding part (13) co-operating with an annular lug (14) of the ring (10) (spring expanded) which protrudes towards the outside of the housing body (3) and thus is capable of communicating with the stop. The lug is positioned on the ring at a location such that when the confined spring is expanded and the lug and stop are in communication, the ring protrudes below the bottom of the housing body by reason of the urging of the spring.

Figure 2:
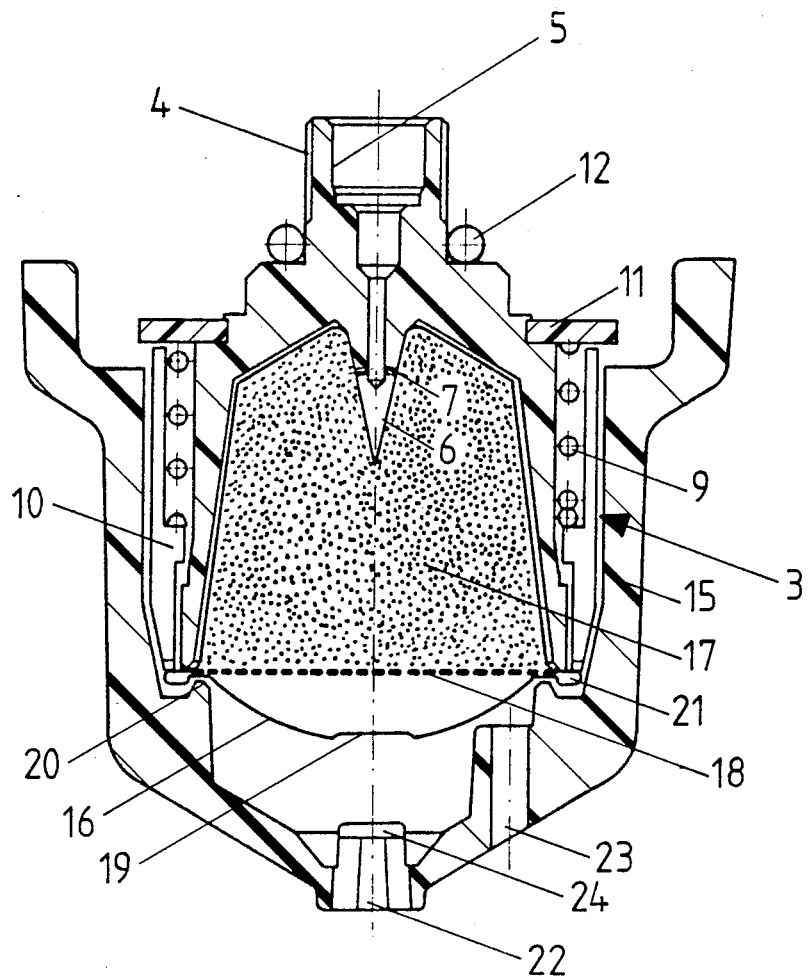
FIG. 2 is an identical section showing the extraction device in operation.

As illustrated in FIG. 2, a cartridge holder is provided which has a housing having an annular edge for holding a rim or edge (21) of a cartridge for positioning the cartridge in the interior of the housing body (3), for cooperating with the movable ring for holding the cartridge in position during extraction and for holding the cartridge as it is removed from housing body (3) with assistance from the spring action of the ring pushing down on the cartridge rim. The cartridge holder is hollowed and adapted for passage of the extracted beverage through passage (22). An air inlet opening (23) and a passage jet-cut off (24) are also provided, and as illustrated, the cartridge holder has an upper portion extending from the annular edge of the holder about the ring.

For extraction, the procedure is as follows: a cartridge (16) is placed in the cartridge holder (15), after which the cartridge holder is placed beneath the extraction device (1) according to the invention so that the injection element (6) pierces the cartridge. The hot water arrives on the ground coffee (17) through the holes (7) under a pressure of at least 8 bars. By virtue of this high pressure, there is no need for a seal at the level of the injection element (6), the water remaining firmly in the cartridge. The annular edge (20) on the cartridge holder co-operates with the lower end of the hollow cylindrical body (3) in order firmly to hold the edge (21) of the cartridge (16). This firm holding of the edge is essential because, during extraction, the filter (18) of the cartridge is subjected to pressures capable of reaching 90 kg. Without this firm holding, the filter would be deformed or torn which would result in poor extraction of the cartridge and hence in an unacceptable espresso coffee. The cover (19) of the cartridge then splits open along its weakening line and the beverage ready for consumption is recovered through the passage (22). The coffee flows cleanly into the cup by virtue of the jet cut-off (24) and the air inlet opening (23). This device gives an aerated and unctuous espresso beverage in which even the volatile aromas are recovered for a total extraction time of the order of twenty seconds.

At the end of the extraction process, the cartridge holder (15) is released, the ring (10) pushing the cartridge (16) under the effect of the spring (9) so that the cartridge is deposited in the cartridge holder. The system is then ready for another extraction.

We claim:

1. A device for extracting material contained in a cartridge comprising:

a housing body having a substantially cylindrical hollow interior extending to and terminating at an open bottom of the housing body, the hollow interior being defined by the inside of the housing body and substantially conforming with an outer form of a cartridge containing material to be extracted, for accepting the cartridge for extraction and having an upper portion including a injection element having a point protruding into the hollow interior of the housing body along a central longitudinal axis of the interior of the housing body for opening and penetrating the cartridge for extraction;

at least one hole in the injection element communicating with a bore through the upper portion of the housing body for receiving water and for providing water to the cartridge for extraction;

an upper part protruding from the upper portion of the housing body outside of the housing body;

a lower stop, beneath and displaced from the upper protruding part, on a lower portion of the housing body protruding from the outside of the housing body;

a movable ring circumscribing the housing body and the stop and having a lug protruding towards the outside of the housing body at a position above the stop capable of communicating with the stop, the lug being at a position on the ring such that when the lug and stop are in communication, the ring protrudes below the bottom of the housing body; and a spring confined between the lug and the upper protruding part and the ring and the housing body for urging the lug into communication with the stop.

2. A device according to claim 1 wherein the injection element has from between one and six holes.

3. A device according to claim 1 or 2 further comprising a cartridge holder having a housing having an annular edge for holding a rim of a cartridge for positioning the cartridge within the hollow interior for extraction, for holding the cartridge in position during extraction by means of the annular edge in cooperation with the movable ring, and for removing the cartridge from the hollow interior in cooperation with urging of the movable ring on the cartridge rim and having a passage for beverage extracted from the cartridge to flow through.

4. A device according to claim 3 wherein the cartridge holder has an upper portion extending from about the edge of the holder about the ring.

5. A device according to claim 1 wherein the holes comprise bores having an angle of from 70° to 80° with respect to the axis of the hollow interior.

6. A device according to claim 1 or 5 wherein the pointed injection element has an inclined surface having an angle of from 20° to 40°.

7. A device according to claim 1 wherein the spring is a helical spring.

* * * * *